(12) United States Patent
Robin et al.

(10) Patent No.: US 8,564,548 B2
(45) Date of Patent: Oct. 22, 2013

(54) SYSTEMS AND METHODS FOR USING A DIGITAL PALETTE TO PRODUCE A DIGITAL DOCUMENT

(75) Inventors: Michael Robin, Redmond, WA (US); Paulo Barthelmess, Fremont, CA (US); David McGee, Bainbridge Island, WA (US); Philipp Schmid, Mercer Island, WA (US); Phil Cohen, Bainbridge Island, WA (US)

(73) Assignee: Adapx, Inc., Seattle, WA (US)

( * ) Notice: Subject to any disclaimer, the term of this patent is extended or adjusted under 35 U.S.C. 154(b) by 1096 days.

(21) Appl. No.: 12/472,300

(22) Filed: May 26, 2009

(65) Prior Publication Data

US 2009/0289927 A1  Nov. 26, 2009

Related U.S. Application Data

(60) Provisional application No. 61/055,705, filed on May 23, 2008.

(51) Int. Cl.
*G06F 3/041* (2006.01)

(52) U.S. Cl.
USPC ...... 345/173; 345/179; 178/18.01; 178/19.01

(58) Field of Classification Search
USPC .................... 345/173–183; 178/18.01–19.07
See application file for complete search history.

(56) References Cited

U.S. PATENT DOCUMENTS

| | | | |
|---|---|---|---|
| 2003/0107558 A1 | 6/2003 | Bryborn et al. | |
| 2003/0161014 A1* | 8/2003 | Tobita et al. | 358/537 |
| 2006/0074735 A1* | 4/2006 | Shukla et al. | 705/8 |
| 2006/0267965 A1* | 11/2006 | Clary | 345/179 |

* cited by examiner

*Primary Examiner* — Michael Pervan
(74) *Attorney, Agent, or Firm* — Richard C. Vershave; Foster Pepper PLLC

(57) ABSTRACT

A digital palette and a digital pen device are used to create or manipulate a digital document to provide complex information using features, such as graphical features selected from stencils, shapes, and connectors and possibly to apply one or more attributes to the digital document. The digital palette may have a custom layout. The features on the digital palette may be selected from a variety of sources, such as digital stencil libraries. The digital palette and digital document may be arranged on the same or different sheets of digital paper overlying one or more digital patterns. Information communicated from the digital palette to the digital document may be uploaded, processed, reviewed, changed and stored in a computer. Lastly, the digital document may be finalized and printed to incorporate all changes previously made using the digital palette, the digital pen device and the computer.

3 Claims, 7 Drawing Sheets

SYSTEMS AND METHODS FOR USING A DIGITAL PALETTE TO PRODUCE A DIGITAL DOCUMENT

PRIORITY CLAIM

This application claims priority to U.S. Provisional Patent Application Nos. 61/055,705 (filed on May 23, 2008), wherein its subject matter is incorporated herein by reference in its entirety.

FIELD OF THE INVENTION

This invention relates generally to systems and methods for producing a digital document using a digital palette and a digital pen, and more specifically to systems and methods for producing one or more shapes on a digital document using a customizable digital palette.

BACKGROUND OF THE INVENTION

A variety of programs exist for visualizing, creating and communicating complex information over a display screen (e.g., computer screen) or on a hardcopy document. At least some of these programs allow a user to create or manipulate a wide variety of diagrams that may communicate information about, but not limited to, organizational hierarchy, resources, processes, networks, workflows, database systems, calendars, floor plans, maps and building sites. By way of example, Office Visio® produced by the Microsoft Corporation allows users to create or otherwise acquire templates, which may be operated on using stencils.

Stencils are generally defined as a collection of masters associated with a particular Microsoft Visio® drawing type or template. A master is generally defined as a shape on a stencil that one uses repeatedly to create drawings. For example, when one moves a shape from a stencil onto the drawing page, the shape becomes an instance of that master. Stencils are generally defined as any object used to represent information in a graphical form. In most cases, stencils include shapes for creating the complex information, such as, but not limited to, flow chart boxes, callout balloons, organizational chart blocks, and more complicated two and three-dimensional shapes.

Independent from the programs discussed above, conventional digital paper systems, which include a digital writing surface and a digital pen device, have become popular for producing text and fill-in type forms. The digital pen device knows its location in real time on the digital writing surface, which may include a visible or non-visible digital pattern. The writing surface may take the form of a digital tablet or digital paper, for example digital paper made by the Anoto Group AB and having an ANOTO® pattern. Various types of conventional digital pen devices include, but are not limited to, the MAXELL® digital pen, the NOKIA® digital pen, the LEAPFROG FLYFUSION® digital pen, the ANOTO® digital pen, and the LOGITECH® digital pen. Besides knowledge of placement location, some digital paper systems also maintain records of information like pressure or time as well as various "state" values such as color or width.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
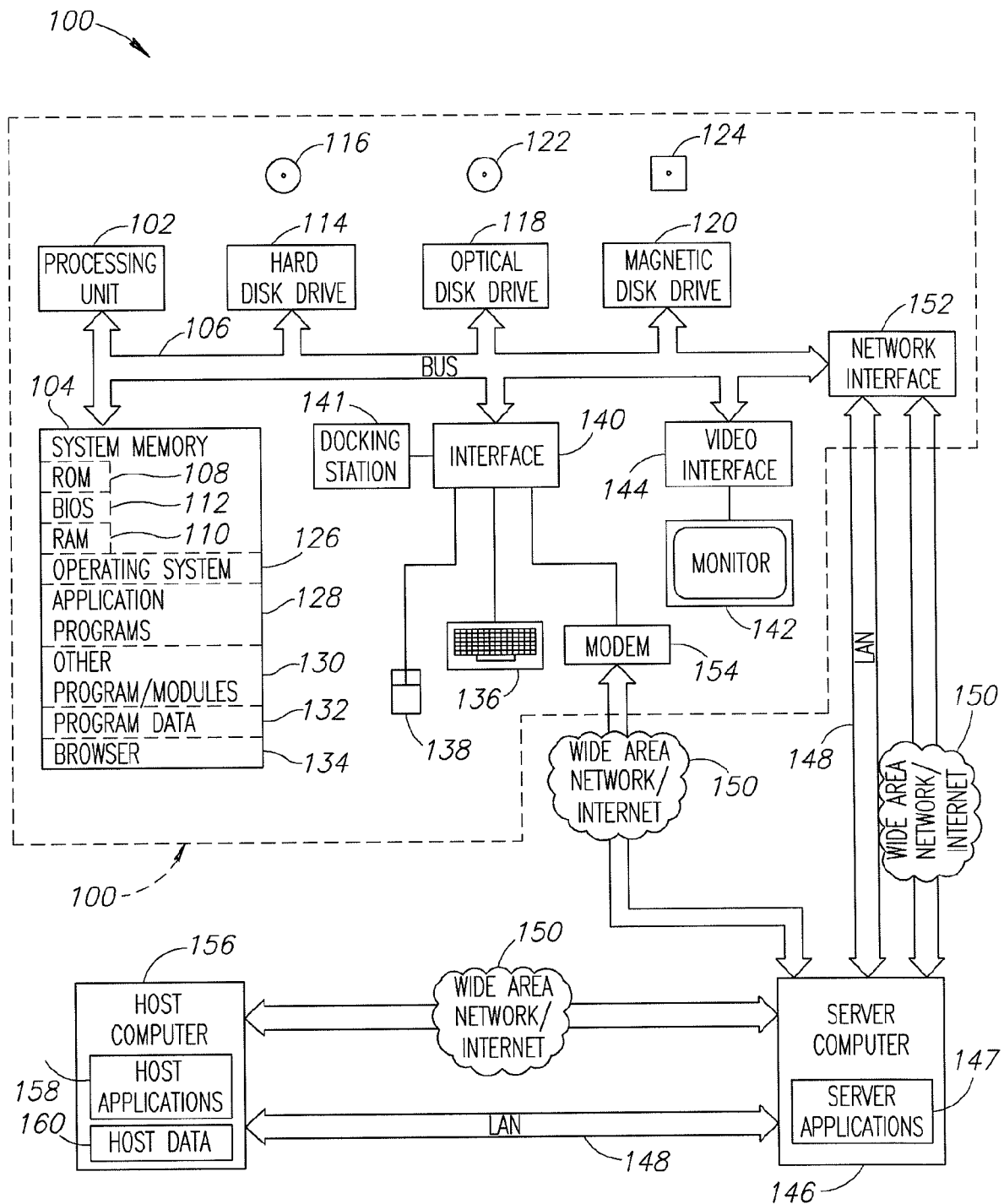
FIG. 1 is a block diagram showing a computer, various computer peripherals, and various communication means for the computer according to an embodiment of the invention.

In the following description, certain specific details are set forth in order to provide a thorough understanding of various embodiments of the invention. However, one skilled in the art will understand that the invention may be practiced without these details or with various combinations of these details. In other instances, well-known systems and methods associated with, but not necessarily limited to, digital palettes, digital documents, digital paper, digital pen devices and methods for creating, manipulating, processing and operating the same may not be shown or described in detail to avoid unnecessarily obscuring descriptions of the embodiments of the invention.

The present invention is generally directed to a digital palette, a digital document and a digital pen device where the digital palette and digital pen device are used to create or manipulate the digital document to provide complex information using features, such as, but not limited to, stencils, shapes, connectors, and attributes. The arrangement of the complex information communicated in the digital document and made available in the digital palette is practically limitless.

The features on the digital palette may be selected from a variety of sources, such as, but not limited to, digital stencil libraries or databases, digital shape libraries or databases, connector libraries or databases, etc., whether accessed from a network, the Internet or from a local memory of the processing system. In addition, a layout of the features on the digital palette is customizable by a user to enhance the efficiency of the digital palette, to achieve a certain look and feel, or for other purposes. In one embodiment, the digital palette and digital document are applied to or printed on separate sheets of digital paper, each having the same or different digital patterns. In another embodiment, the digital palette and digital document are applied to or printed on the same sheet of digital paper that may bear one or more digital patterns.

At least one embodiment relates generally to a digital palette with a customizable layout of features, which may take the form of shapes, connectors, attributes, etc. that may be used to create or manipulate a digital document via executable actions produced by the interaction of the digital pen device with the palette and the document. In one embodiment, a user selects one of the features on the digital palette with the digital pen device and then touches a location on the digital document to apply or place that feature. In another embodiment, the user touches an object on the digital palette, and then roughly sketches a similar shape or connector, providing size, orientation, and position of the object on the digital document with the digital pen device, thus creating a digital connection between the two within a memory of the digital pen device. The digital document may be newly created, take the form of a pre-arranged template, or take the form of a previously-created document requiring one or more revisions. Likewise, the digital palette may be created using a computer or similar system before being printed onto a digital pattern.

In one aspect of the present invention, a digital paper-enabled system includes a digital palette bearing a first digital pattern with a customizable layout of features for communicating information, wherein the features include at least one stencil having a plurality of shapes that are each selectable using the digital pen device; a digital document bearing a second digital pattern and configured to receive one or more features transferred from the digital palette to the digital document, wherein the digital document carries at least one of the plurality of shapes selected from the digital palette; and a digital pen device configured to carry information from the digital palette to the digital document through movement of the digital pen device.

In another aspect of the present invention, a computer interface for creating a digital palette includes a memory configured to store a plurality of features, each feature configured to communicate information about a document; a user interface having a plurality of menu options for selecting and arranging the features according to a desired layout for the digital palette; and a processing system communicatively coupled to the memory and the user interface to interpret the features in the desired layout with respect to a digital pattern onto which the desired layout is to be printed.

In yet another aspect of the invention, a computer system includes a digital pen device for acquiring information associated with a digital document, wherein at least a portion of the digital document receives information from a digital palette by operation of the digital pen device; a processing system; a device for receiving the digital pen device and for communicatively coupling the digital pen device with the processing system; and a memory communicatively coupled to the processing system, the memory storing a plurality of features, wherein the processing system interprets information from the digital pen device in view of the plurality of features stored in the memory to modify the digital document.

And still yet in another aspect of the invention, a method of generating at least a portion of a digital document includes the steps of (1) selecting a feature from a digital palette using a digital pen device, the digital palette having the feature positioned on the digital palette in a desired location relative to a first digital pattern, the feature configured to communicate information about the digital document; (2) using the digital pen device, indicating on the digital document where the feature is to be applied relative to a second digital pattern carried by the digital document; and (3) using the digital pen device, selecting an attribute from the digital palette and applying the attribute to at least one feature within a desired boundary of the digital document.

FIG. 1 in cooperation with the following provides a general description of a computing environment that may be used to implement various aspects of the present invention. For purposes of brevity and clarity, embodiments of the invention may be described in the general context of computer-executable instructions, such as program application modules, objects, applications, models, or macros being executed by a computer, which may include but is not limited to personal computer systems, hand-held devices, multiprocessor systems, microprocessor-based or programmable consumer electronics, network PCs, mini computers, mainframe computers, and other equivalent computing and processing subsystems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer since, in typical embodiments, there will be more than one computer or other device involved. The processing unit 102 may be any logic processing unit, such as one or more central processing units (CPUs), digital signal processors (DSPs), application-specific integrated circuits (ASICs), etc.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The application programs 128, program or modules 130, and program data 132 may include information, instructions and parameters for creating, manipulating, uploading and processing a digital palette and document system. The system memory 104 also includes a browser 134 for permitting the computer 100 to access and exchange data with sources such as web sites of the Internet, corporate intranets, or other networks as described below, as well as other server applications on server computers such as those further discussed below. In one embodiment, the browser 134 may be used to obtain stencils or otherwise build-up libraries of features that may be customizably placed on a digital palette 102 as will be described in greater detail below. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a personal data assistant (PDA), a cell phone, or other mobile device.

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. Another interface device that may be coupled to the bus 106 is a digital pen docking station 141 configured to receivably and electronically engage a digital pen for the purpose of data transmission, charging, etc. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Figure 2A:
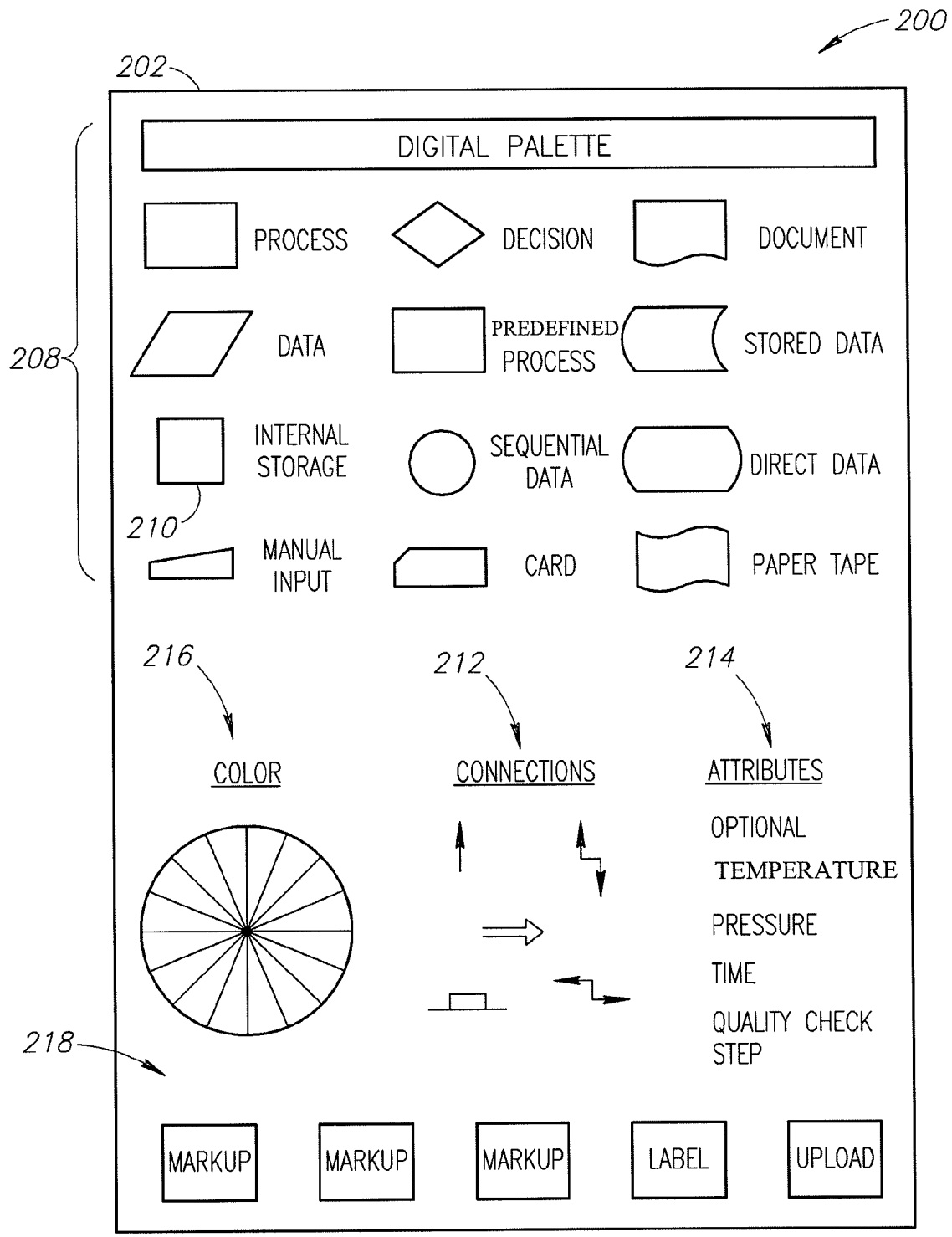
FIGS. 2A, 2B and 2C are schematic diagrams showing a digital palette, a digital document and an interface for viewing the digital document after it has been created or manipulated by operation of a digital pen device in cooperation with the digital palette according to an embodiment of the present invention.
Figure 2B:
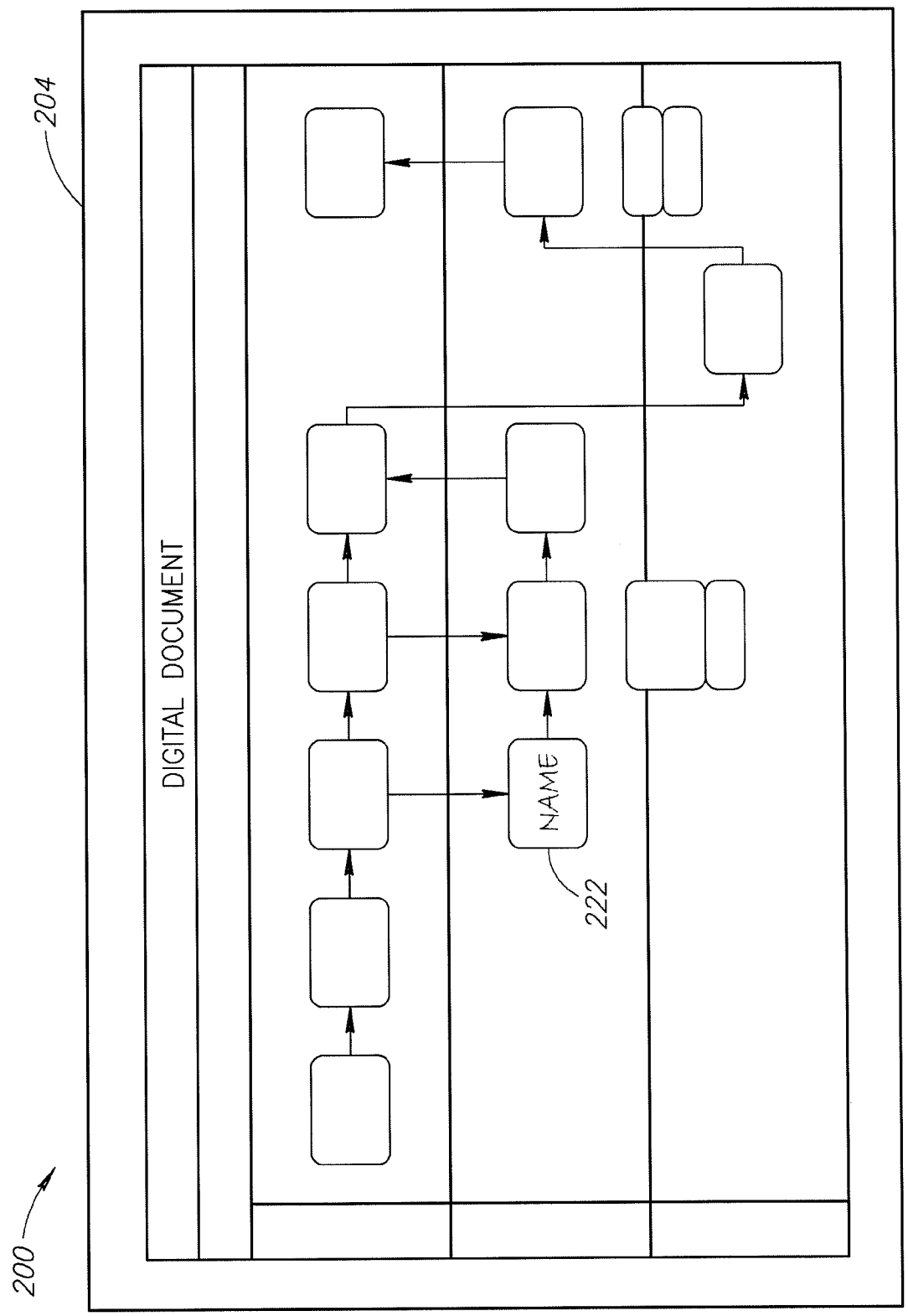
Figure 2C:
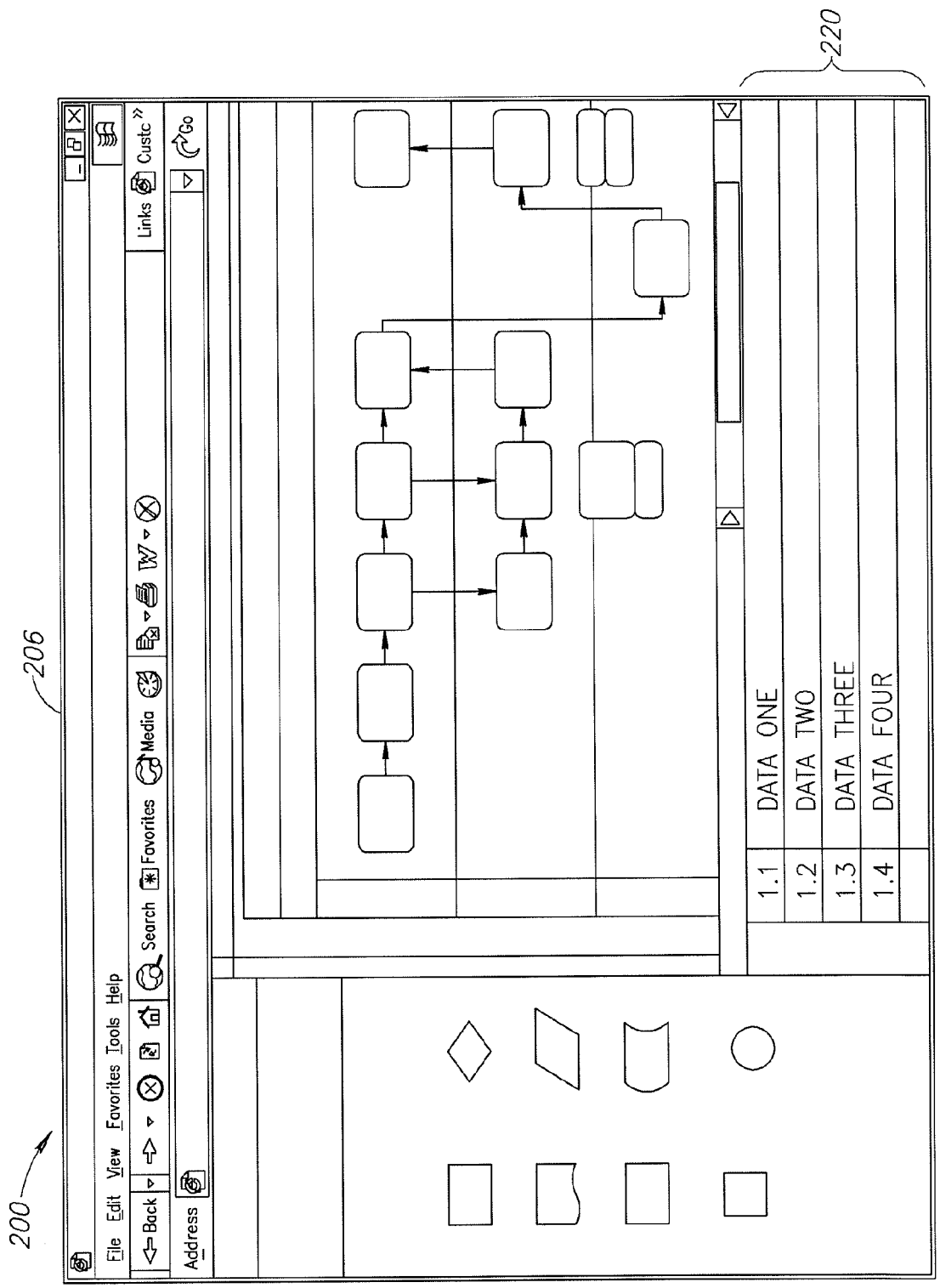
Figure 3A:
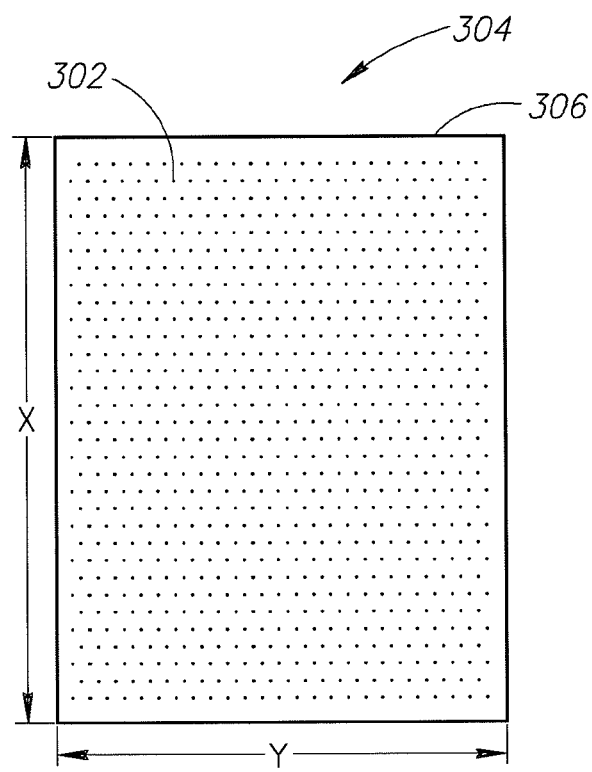
FIG. 3A is a top plan view of a prior-art sheet of digital paper bearing a digital pattern.

FIGS. 2A, 2B and 2C show a digital paper-enabled system 200 having a digital palette 202 (FIG. 2A) that may be used to create or manipulate a digital document 204 (FIG. 2B), which then may be uploaded, processed and possibly further revised using a computer system 206 (FIG. 2C). The digital palette 202 may be initially created or otherwise manipulated using an application program 128 of the computer 100 and viewed through a graphical user interface 140. Once a layout of the digital palette 202 is complete, the digital palette 202 may be printed on a tangible medium that records communication or facts with the help of marks, words, or symbols, such as a digital pattern. Similarly, the document 204 may be newly created or obtained from another application program 128 and then printed on a tangible medium that records communication or facts with the help of marks, words, or symbols, such as a digital pattern. More specifically, the features, marks, or other information shown on the digital palette 202 and the digital document 204 are printed or otherwise applied to a medium having either a visible or a non-visible digital pattern, such as a sheet of digital paper 300 bearing a digital pattern 302 as illustrated in FIG. 3A.

Figure 3B:
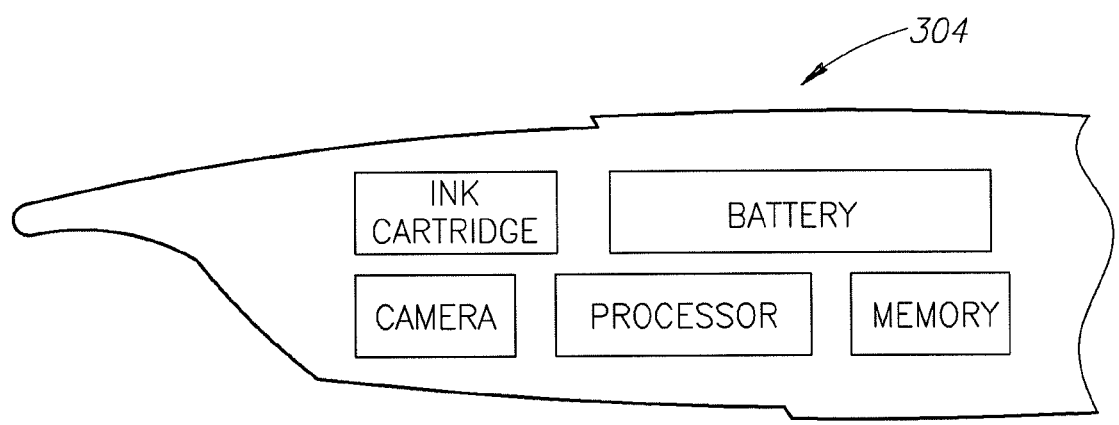
FIGS. 3B and 3C are schematic and perspective views of a digital pen device and docking station, respectively, for uploading information from a digital document to a computer.

It is appreciated the digital palette 202 and the digital document 204 may be located on different sheets of digital paper 300 or may be located on the same sheet of digital paper 300 in any desired arrangement. In addition, the digital palette 202 and the digital document 204 may be formed on different digital patterns 302 or the same digital pattern 302. By way of example, the digital pattern 302 may take the form of an ANOTO® pattern printed under the features as a watermark. In a preferred embodiment, applying the features of the digital palette 202 to the digital document 204 is accomplished with a digital pen device 304, such as the digital pen illustrated in FIG. 3B.

The digital pattern 302 may interact with digital pen device 304, which may otherwise be referred to as an indicating device, a selection device or even a stylus that may or may not employ ink during use. By way of example, the digital pen device 304 may take the form of a digital pen used to mark on, select, indicate, or otherwise interact with the digital palette 202 and digital document 204.

Figure 3C:
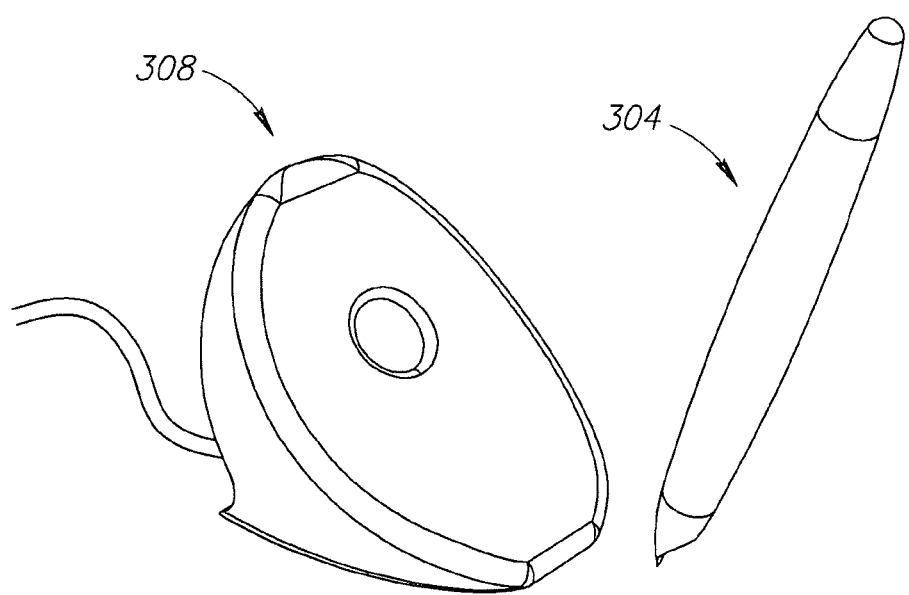

The digital paper 300 may include boundaries (height=X; width=Y) that are adaptable to various size sheets and customizable as desired for a variety of applications. The digital paper 300 may also be referred to as interactive paper. The digital pattern 302 may generally take the form of a dot pattern that uniquely identifies positional coordinates on the digital paper 300, which may be bordered by a reference frame or boundary 306 (FIG. 3A). In one embodiment, the pattern 302 takes the form of an ANOTO® pattern. The digital pen device 304 may be used to store, record or even contemporaneously transmit any information such as any marks, selections, indications or interactions that effect one or more of the features. Information stored or recorded may be transmitted or uploaded to the computer 100 at a later time, for example when the user docks the digital pen device 304 into a docking station 308 (FIG. 3C), which in turn may be coupled to the bus 106 of the computer 100 (FIG. 1).

In one embodiment, the digital palette 202 includes a layout of features such as, but not limited to, shapes 208, connectors 210, attributes 214, colors 216, line widths, fill colors, and editorial actions 218. In one embodiment, the editorial actions 218 may be used to add, delete, or modify an attribute 214 when it is applied to the digital document 204. The attributes 214 on the digital palette 202 may be modified after the digital palette has been printed by writing over it with the digital pen device 304 or by writing both the attribute name and its new value, separated by a special separator symbol, such as a colon (:) or an equal sign (=).

One or more of these features may be obtained from a library or a database, selected, and then applied to the digital palette 202 using the computer 100 before printing of the digital palette 202. By way of example, the shapes 208 and connectors 210 may be selected from groupings referred to as stencils. Generally, a stencil includes shapes 208 and connectors 210 that may be used to create the document 204. In one embodiment, the shapes 208 can range from simple flow chart boxes or lines to more complicated shapes having two-dimensional or three-dimensional aspects. In short, the shapes 208 may be configured to graphically represent or otherwise communicate a broad range of information.

In one embodiment, the features digitally define objects such as, but not limited to, icons, graphical elements, symbols, characters, indicia, mathematical or computational elements, shapes, connectors, or any other feature (hereinafter generally referred to as feature or features) that may be used to graphically communicate information on a document. The features may have spatial relationships with respect to one another, to a desired coordinate system, and to their location with the digital pattern of the digital paper. By way of example, the features may be data-connection type shapes and connectors taken from a known program such as Microsoft Visio® to produce a flow or process chart, for example.

The number and types of features that are selectable for placement on the digital palette 202, further defined by any values given their attributes, are essentially limitless. The features may be chosen from available features accessible by any of the means described above or other means. In addition or alternatively, the features may be created and modified by the user and such features will be referred to as prototype features herein. A prototype feature can be manipulated to contain specifically the values of the attributes that the user is likely to use with the digital palette. Once prototype features are developed in a document (referred to as a prototype document palette), then this document itself can be used as a specialized form of a palette.

The features may or may not be visible, and may be editorially actionable or benign. The term editorial action as used herein may refer to a variety of interactions, requests, selections, queries and other activities that may be expressly initiated by the user and/or interpreted with respect to the digital palette 202.

By way of example, the features may be attributes 214 used to apply information to shapes 208 and connectors 210 after selection from the digital palette 202 and placement onto the digital document 204 with the digital pen device 304. The attributes 214 may take a variety of forms to communicate additional information. By way of example, one attribute 214 may include a thickened border around a flow chart box, different shading, or a different color, a flashing border, etc. to indicate some of the information therein was recently updated. In a mechanical diagram, the attributes 214 may include having certain objects with a desired color to indicate a particular operating temperature or pressure range. In another example, an object may be given the attribute 214 of time entry to indicate when a next service or maintenance was due. Consequently, the types of attributes 214 and the information provided them is essentially limitless. Referring to FIG. 2C, information supplied by the attributes 214 may be presented in a spreadsheet or table 220 and viewable on a monitor 142 of the computer system 100. In one embodiment, the attributes 214 may have been hidden or otherwise not viewable on the digital document 204, but yet may appear in the spreadsheet or table 220, preferably if the user opens the information on the computer 100 using a proper access code, logon identification, and/or password. For example, one hidden attribute 216 of an organizational chart may be a salary of an employee, manager or executive. The data in the spreadsheet or table 220 may be manipulated in a variety of ways, such as but not limited to sorted, deleted, revised, added, swapped, re-arranged, etc. Some or all of these changes may be saved on the computer 100 and later printed to create a finalized digital document 104.

Referring to FIG. 2B, when the digital document 104 is generated (e.g., printed), the printed version may be referred to as a static or frozen version because changes to the document may only be made through interaction with the digital palette 102 and digital pen 304 or through interaction with the computer 100 (FIG. 1).

Still referring to FIG. 2B and by way of example, the digital pen device 304 may provide a series of ink strokes 222 placed on one or more pages of the digital document 104, where the location of each stroke relative to the underlying pattern 302 is recorded. This information may then be received by the computer 100 such that the digital document 104 may be updated based on the actions or operations applied to the digital document 104. For example, if the digital document 104 was printed with an image displayed thereon, the location of the strokes could be determined relative to the image or portions of the image using one or more coordinate systems associated with the digital pattern 304. In addition, the computer 100 may employ a handwriting recognition system to interpret handwriting 222 applied to the digital document 104 and possibly interpret other ink marks made thereon.

The digital palette 202, digital document 204, digital pen 304 and computer 100, as described herein, provide the ability to create, modify and/or delete portions and sub-portions of document 104 that communicates at least some information by graphical means (e.g., shapes 208, connectors 210, etc.). In addition, attributes may be included as meta-data to qualify or otherwise add information to the document 102. The digital palette 202 and digital document 204 are interactive systems, meaning that in most instances the user may interact with them using the digital pen device 304.

Figure 4:
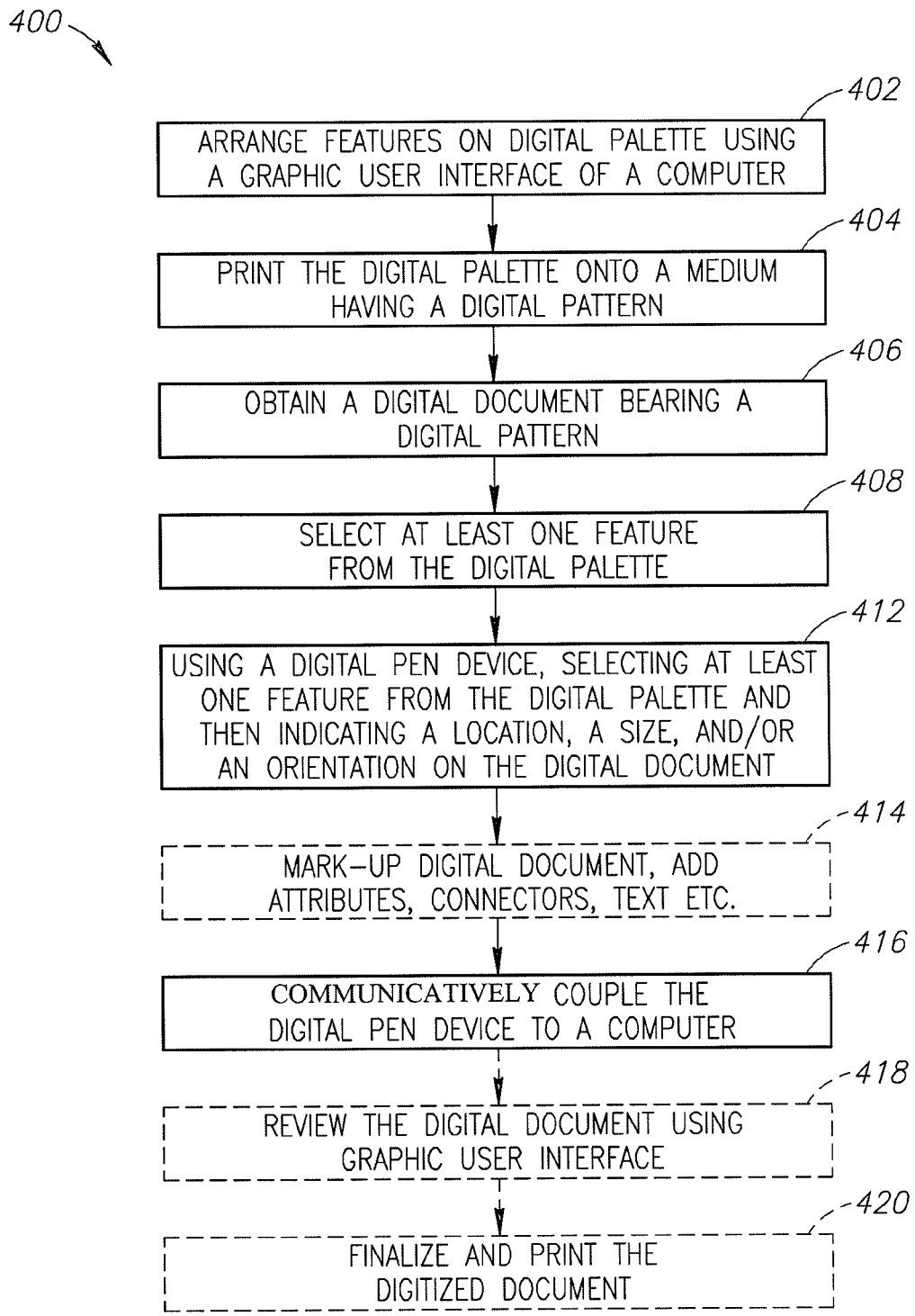
FIG. 4 is method for creating or manipulating a digital document with a digital palette, a digital pen device and a computer according to an embodiment of the present invention.

FIG. 4 shows a method 400 for arranging features on the digital palette 202 using a computer; printing the digital palette 202 onto a digital pattern; using the digital document to create or manipulate the digital document 204 by operation of the digital pen device 304; optionally adding other information to the digital document 204 using the digital pen device 304; uploading information from the digital pen device for processing by the computer 100; reviewing and finalizing the digital document 204 using the computer 100; and then printing the digital document 204. At step 402, an existing digital palette or newly created digital palette 202 may be manipulated by arranging features in a desired or customized layout through interaction of a graphical user interface 140 of the computer 100. As noted above, the features may include shapes 208, connectors 210, colors 214, attributes 214 and actions 218. Once the layout of the digital palette 202 has been completed, then at step 402 the digital palette 202 is printed onto a medium having a digital pattern 302. The medium, in most instances, will take the form of digital paper.

At step 406, a digital document 204 bearing a digital pattern, which may be the same or different from the digital pattern 302, is obtained (e.g., printed, downloaded, or existing hardcopy). The digital document 204 may be an existing document that requires revisions, may be a template for communicating desired information, such as, but not limited to, an organizational chart template, a process flow diagram template, and a system diagram template, or the digital document may be a blank document. The digital document 204 may be printed on the same or different medium as the digital palette 202.

At step 408, the digital pen device 408 is used to select at least one feature from the digital palette 202 and apply it to the digital document 204. By way of example, at step 412, the user operates the digital pen device 304 to select at least one of feature from the digital palette 202, and then contemporaneously marks on the digital document 204 to indicate a size and/or orientation corresponding to the feature while also indicating at least a general location for placement of the feature on the digital document 204. Thus, a memory of the digital pen device 304 records a connection made between the marking on the digital document 204 and the corresponding selection from the digital palette 202. For example, the user may touch the digital pen device 304 to an oval feature on the digital palette 202 and then sketch an oval-shaped feature on the digital document 204, so that when the digital pen device 304 is uploaded and processed the an oval-shaped feature is added to the document 204. In another example, if the digital document 204 were a blank document, then the digital pen device 304 and digital palette 202 may be used to create all of the shapes, connectors, etc. on the digital document 204 from scratch using those features made available on the digital palette 202.

In an optional step 414, the user may further enhance or change the digital document 204 through various mark-ups, such as adding symbols to indicate that some feature on the document should be deleted and/or by adding or manipulating attributes, connectors, and/or text. These mark-ups are performed with the digital pen device 304 and recorded in its memory for subsequent uploading to the computer.

At step 416, the digital pen device 304 is communicatively coupled to the computer 100 either through a direct connection, such as the digital pen docking station 141, or by a remote or wireless connection. The information recorded by the digital pen device 304 may be downloaded to the computer 100 through a variety of means, such as the docking station 141 having a USB cable or a wireless (e.g., Bluetooth) connection to the computer 100. The digital pen device 304 may use ink or an equivalent, visible marking substance as it captures the writing on the digital document 202 with an infrared camera. The digital pen device 304 may further include an image processor, a memory and a rechargeable power supply. The transfer of information from the digital pen device 304 to the computer 100 may be other various forms, such as, but not limited to a wireless or Bluetooth transmission either in real time or in a batch mode, a wired connection, for example through a USB cable, or some other known method of transferring data from one device or system to another. The computer 100 may include various checks and balances or modules 130 during data transmission to insure the data is transmitted completely and correctly to the computer 100.

At step 418, the digital document 204 may be reviewed by the user or someone else through a graphical user interface of a computer. During the review process, the reviewer may make additional changes or modifications using the typical input devices 136, 138 of the computer. Once the digital document 204 is considered to be in a finalized and possibly approved form as viewed on the computer, the digital document 204 may be printed at step 420. If other changes are needed the entire process or selected portions of the method 400 may be repeated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer system comprising:
   a digital pen device for selecting stencil information from a digital palette applied to a first digital document and applying the stencil information to a second digital document, wherein the digital pen device records the selected stencil information, applies the stencil information to a selected location on the second digital document, and further records the selected location based on a digital pattern applied to the second digital document;
   a processing system;
   a docking device for communicatively coupling the digital pen device with the processing system; and
   a memory communicatively coupled to the processing system, the memory storing a plurality of features including a library of stencil information, wherein the processing system receives the recorded stencil information and receives the recorded location from the digital pen device, and wherein the processing system provides computer-readable instructions for modifying the second digital document to incorporate the recorded stencil information at the recorded location.

2. The system of claim 1, wherein the library of stencil information includes at least one stencil having a plurality of selectable shapes.

3. The system of claim 1, wherein the first digital document and the second digital document are physically separate documents.

* * * * *